Jan. 25, 1955　　　P. J. GLEASON ET AL　　　2,700,449
PALLET HANDLING APPARATUS
Filed Dec. 27, 1951　　　　　　　　　　　　　3 Sheets-Sheet 1
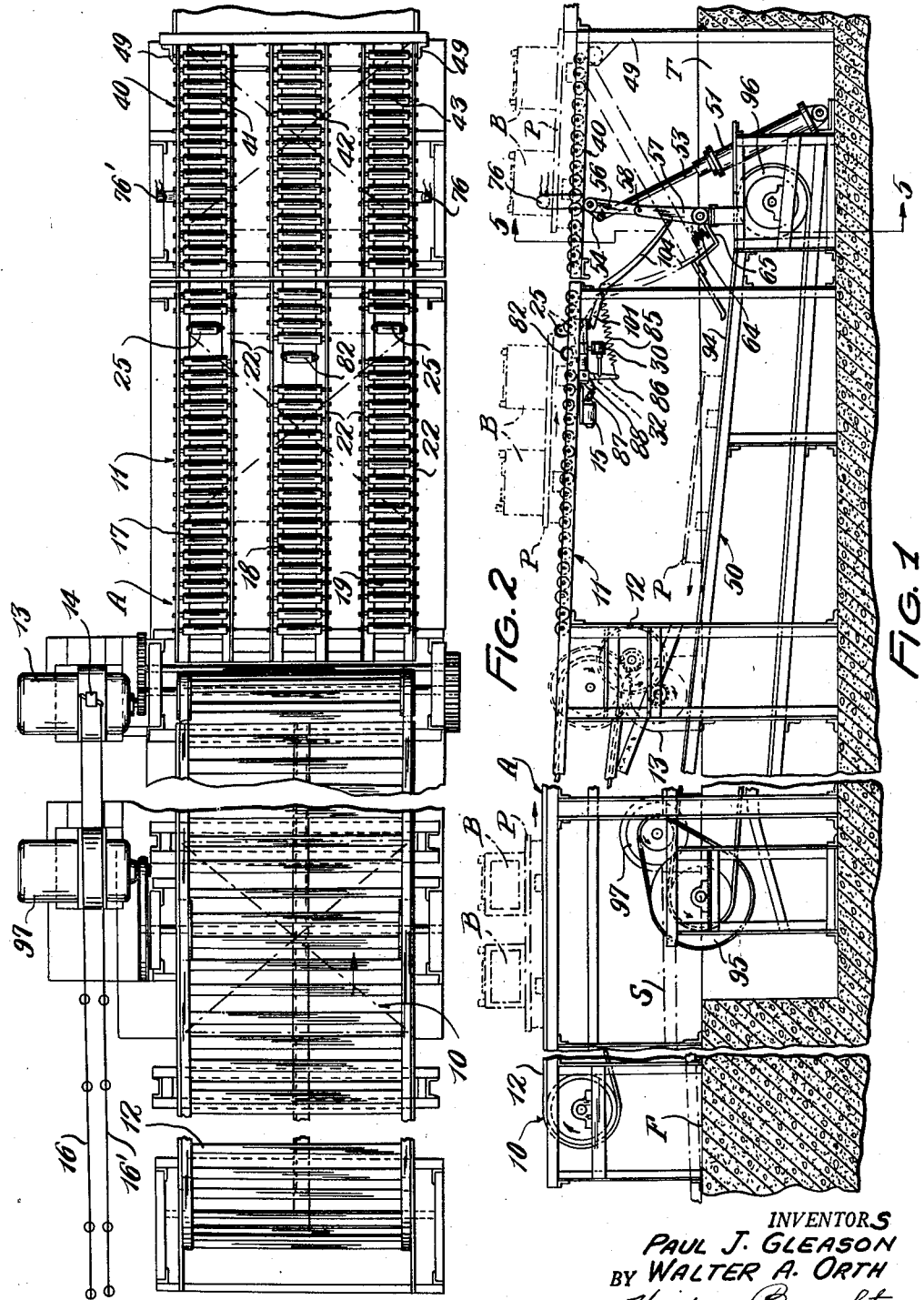
INVENTORS
PAUL J. GLEASON
BY WALTER A. ORTH
Hudson, Boughton,
Williams, David & Hoffmann
ATTORNEYS

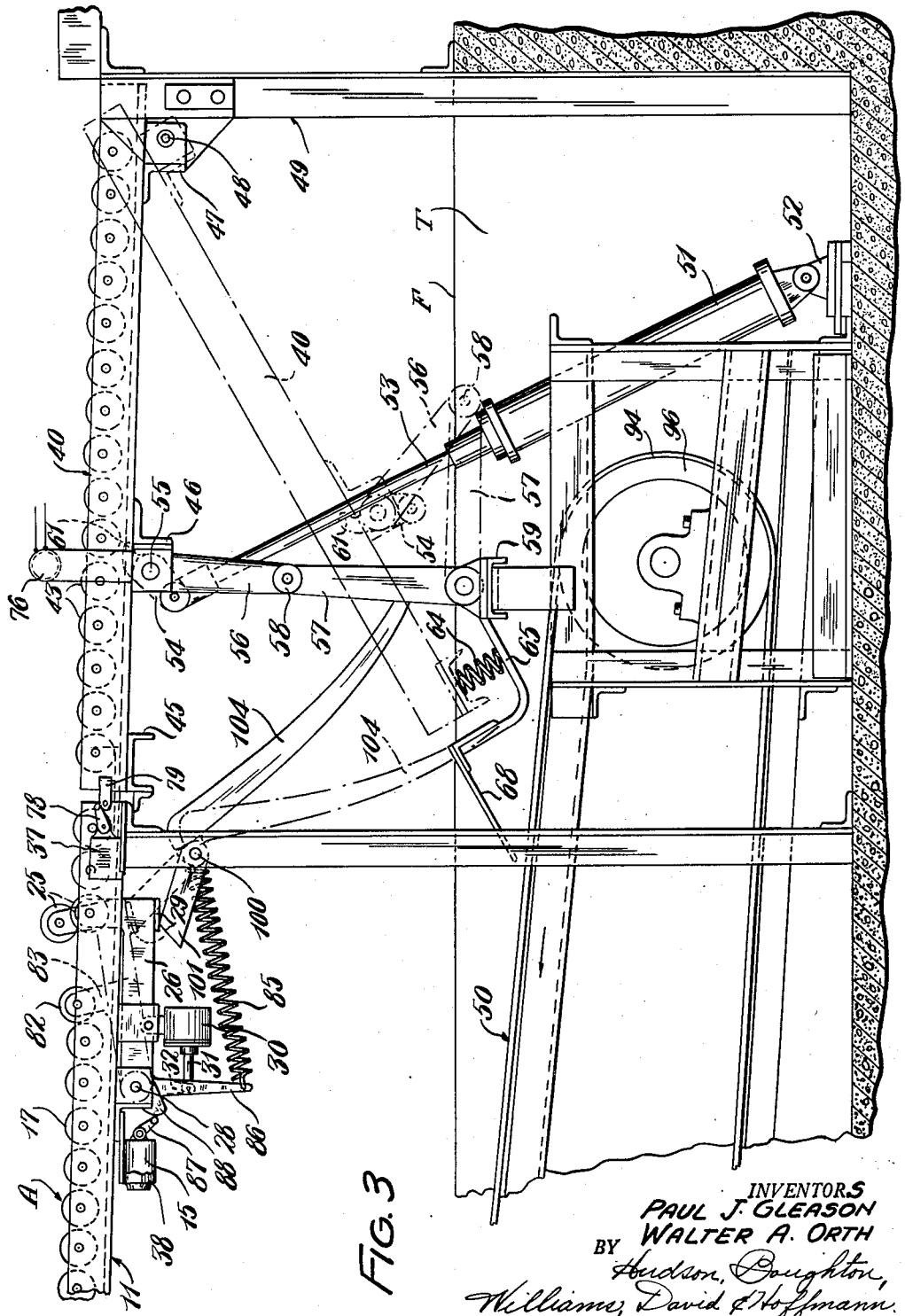

Jan. 25, 1955 P. J. GLEASON ET AL 2,700,449
PALLET HANDLING APPARATUS
Filed Dec. 27, 1951 3 Sheets-Sheet 3

INVENTORS
PAUL J. GLEASON
WALTER A. ORTH
BY
Williams, Hudson, Coughton,
David & Hoffmann
ATTORNEYS

United States Patent Office 2,700,449
Patented Jan. 25, 1955

2,700,449

PALLET HANDLING APPARATUS

Paul J. Gleason and Walter A. Orth, Cleveland, Ohio, assignors to The Electric Storage Battery Company, a corporation of New Jersey Application December 27, 1951, Serial No. 263,672

9 Claims. (Cl. 198—27)

The present invention relates to pallet handling apparatus by which loaded pallets can be efficiently moved to an unloading station and the unloaded pallets dispatched to a convenient point for re-use or storage.

The principal object of the invention is the provision of a new and improved pallet handling apparatus comprising a conveyor means for bringing loaded pallets to an unloading station and platform means at the unloading station normally in registration with the conveying means for receiving loaded pallets therefrom and shiftable to a second position for discharging unloaded pallets onto a second conveying means which carries them to a convenient point for storage or re-use, in combination with means to automatically control movement of loaded pallets from the first conveying means onto the platform means to prevent overloading of the platform means or movement of the pallets from the conveying means while the platform means is shifted out of registration therewith.

Another object of the invention is the provision of a new and improved pallet handling apparatus of the character mentioned having means to control the shifting of the platform means at the unloading station from registration with the delivery conveyor to its pallet discharge position, which means includes a device responsive to the presence of a load on a pallet on the platform means to prevent shifting of the platform means to discharge a pallet therefrom while loaded or before the pallet is unloaded.

The invention resides in certain constructions and combinations and arrangements of parts and further objects and advantages will be apparent to those skilled in the art to which it relates from the following description of the preferred embodiment described herein with reference to the accompanying drawings forming a part of this specification, in which similar reference characters designate the corresponding parts throughout the several views, and in which Fig. 1 is a fragmentary side elevational view of a pallet handling apparatus embodying the invention and operative to convey pallets bearing storage batteries to a battery unloading station and thereafter dispatch the unloaded pallets to a stacking area for re-use.

Fig. 2 is a fragmentary plan view of the apparatus shown in Fig. 1.

Fig. 3 is an enlarged view of a portion of Fig. 1.

Figures 4, 5, 6:
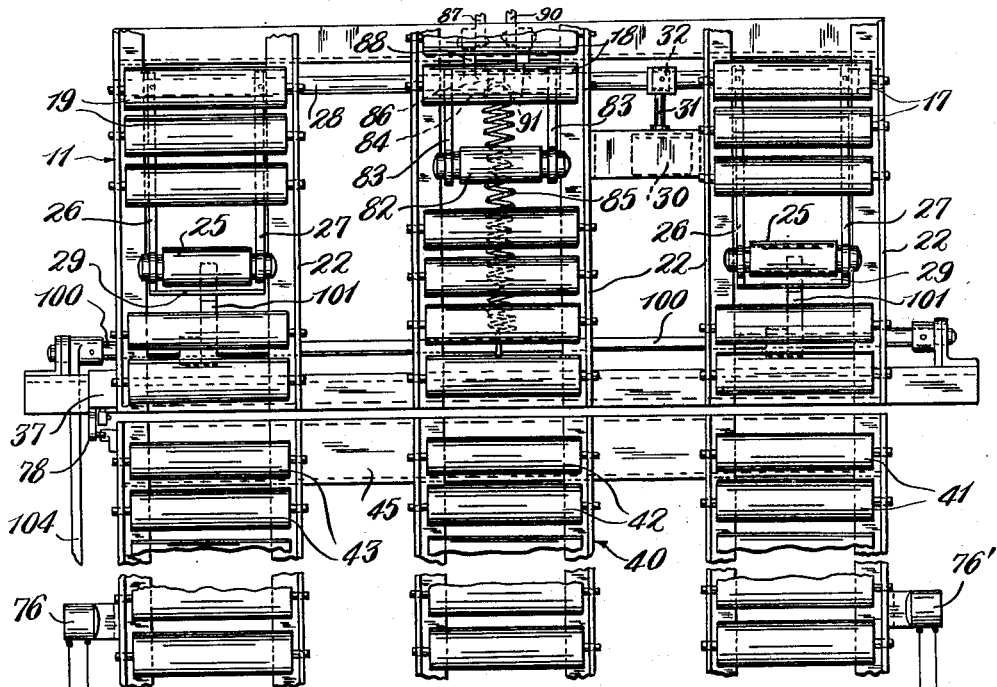
Fig. 4 is an enlarged view of a portion of Fig. 2.
Fig. 5 is a sectional view taken on line 5—5 of Fig. 1 but on a larger scale; and, Fig. 6 is a wiring diagram of the control system for the dispatcher.

Although the invention is applicable to the handling of pallets generally, it is particularly applicable to and it is herein shown and described as embodied in apparatus employed in the manufacture of storage batteries of the lead-acid type. Storage batteries are relatively heavy and difficult to handle since they must be maintained upright and pallets provide convenient means for moving them from place to place. The pallets employed for this purpose are generally of a size to hold six or more batteries and are preferably of the type comprising three parallel spaced, vertical webs or ribs on which a platform is supported and between which the tines of a lift truck can be inserted for lifting the pallets. The ribs of the pallets also have tine or fork-receiving openings therethrough so that the pallet can be handled by a lift truck from either side as well as both ends. The present pallet handling apparatus is particularly useful when it is desirable to unload pallets having batteries thereon at a particular location.

The apparatus shown comprises a feed conveyor, designated generally at A, supported on the floor F of the factory and extending for a considerable distance to the left of the unloading station, hereinafter referred to. The feed conveyor A comprises a power driven conveyor section 10 and a gravity conveyor section 11. The power driven conveyor section 10 is of conventional construction, comprising an endless slat-type belt 12 supported on suitable pulleys, one of which is driven by an electric motor 13. The conveyor section 10 is preferably arranged so that fork lift trucks may approach it from either side and deposit loaded pallets P thereon substantially throughout the length thereof and it operates to carry pallets deposited thereon toward the right, as indicated in Fig. 1.

The conveyor motor 13 is connected with power lines L1, L2 and is controlled by two switches 14, 15 connected in series. Switch 14 has an operating member which has two cords 16, 16' attached thereto by which it is movable in opposite directions to open and close the switch contacts when the respective cords are individually pulled. The cords extend along the conveyor section 10 on suitable overhead supports, not shown, and have pull handles thereon within convenient reach of the lift truck operation so that the truck operator may pull the cords to stop the conveyor section to permit loading of pallets thereon and again start the conveyor after a loading operation is completed. The switch 15 is normally closed and is controlled by means to be described hereinafter, but suffice it to say it is automatically opened to prevent crowding of pallets at the right-hand end of the conveyor.

The driven conveyor section 10 discharges onto a gravity conveyor section 11 which comprises three parallel tracks of free-running rollers 17, 18, 19, which tracks slope to the right which causes pallets thereon to move by gravity toward the right-hand end of the section 11. The ends of the rollers 17, 18, 19 are freely journaled in parallel side members 22, and the tracks of rollers are spaced apart to receive the respective vertical ribs of the pallets.

The gravity movement of the pallets is halted adjacent to the right-hand end of the conveyor section 11 by a pair of rollers 25, each supported by two arms 26, 27 fixedly attached to a rocker shaft 28 suitably journaled on the underside of the conveyor structure, and which rolls may be raised and lowered into and out of the path of movement of the pallet ribs riding on the outer tracks of rollers 17, 19. Bars 29 connect the outer ends of the respective arms 26, 27. The rocker shaft 28 is oscillated to raise and lower the rolls 25 by a pneumatic motor 30 having a piston 31 pivotally attached to an arm 32 fixed on the shaft 28. The motor 30 is so selected with respect to size that it is incapable of exerting sufficient force on the arms 26, 27 to raise a pallet which may be passing over the rolls 25. The movement of the piston 31 in opposite directions is controlled by an air valve 34 which is actuated by two solenoids 35, 36. The solenoid 35, when energized, actuates the valve 34 to a position to cause the piston to move outwardly and lower the rolls 25, and the solenoid 36, when energized, actuates the valve to a position to cause the piston to move to raise the rolls. The valve remains in whichever position it is moved until shifted by one or the other of the solenoids. The solenoids 35, 36 are connected with lines L1, L2 by individual circuits, including normally open switches 37, 38, respectively, each automatically controlled as described hereinafter.

An unloading platform 40 is provided at the unloading station and adjacent to the right-hand end of the gravity conveyor section 11. The platform shown comprises three tracks of free-running rollers 41, 42, 43 similar in construction to and supported in registration with the tracks of rollers 17, 18, 19, respectively. The tracks of rollers 41, 42, 43 are tied together and rigidly supported as a unit by cross-members 45, 46, 47 attached thereto, and the right-hand end of the platform is pivotally supported by bearings 48 on a pair of uprights 49, which rest in a trench T extending therebeneath and the right-hand end of the conveyor A.

As may be seen in broken lines in Fig. 3, the platform is adapted to pivot on its bearings 48 and swing downwardly out of registration with the end of the conveyor section 16 into a position to discharge pallets by gravity onto a return conveyor 50 located in the trench T.

The platform 40 is raised and lowered by power means comprising a pneumatic cylinder 51 pivotally attached at its lower end to a bracket 52 and having a piston 53 reciprocating therein, which piston is pivotally connected at its upper end with the platform through a lever 54 fixed to a rocker shaft 55 journaled on the cross member 46. The swinging end of the platform 40 is supported in its raised position on a level with the conveyor section 16 by two sets of toggles comprising links 56, 57 pivoted together at 58. The upper ends of the links 56 are fixedly attached to the shaft 55 and are rotatable thereby, and the lower ends of links 57 are pivoted to a bracket 59 on the frame of the conveyor 50. The construction is such that when the piston 53 is extended, as shown in full lines Fig. 3, the links 56 are rotated to a vertical position and form knuckling joints with the links 57 and therewith provide a rigid support for the platform 40. A stop lug 61 is provided on the rocker arm 54 which engages the cross member 46 to limit clockwise rotation of the shaft 55 to position the links 56 vertically. When the piston 53 is retracted, shaft 55 is rotated counterclockwise by the arm 54 and moves the links 56 to collapse the knuckled toggles, as shown in broken lines in Fig. 3, thereby permitting the platform 40 to swing downwardly.

The lower end of the platform 40 engages resilient stops in the form of two coil springs 64, only one of which appears in the drawings, which are supported on brackets 65, 66 attached to the bracket 58. The outer ends of the brackets 65, 66 support a plate 68 which serves as an apron to transfer pallets moving from the lowered end of the platform 40 onto the conveyor 50.

The operation of the piston 53 in the cylinder 52 is controlled by a pneumatic valve 70 actuated by a pair of solenoids 71, 72. The solenoid 71 is operative, when energized, to actuate the valve and cause the piston to be moved outwardly to raise the platform 40 and lock it in its raised position, and the solenoid 72 is operative, when energized, to actuate the valve and retract the piston to lower the platform, as described. The solenoids 71, 72 are connected in circuit with lines L1, L2, and the circuit for the solenoid 71 includes a normally open, manually closable switch 73 which is located convenient to workmen unloading pallets on the platform 40 so that the platform can be raised by a workman depressing the switch operating member.

The circuit for the solenoid 72 includes two switches 74, 75 connected in series. Switch 74 is a normally open, manually closable type convenient for actuation by a workman at the platform 40, and switch 75 is actuated by a photo-electric cell mechanism 76. The photoelectric cell mechanism 76 is responsive to the presence of one or more light beams projected by a light source 76' across and immediately above the trailing ends of pallets moved onto the platform 40 to close the switch 75 and to open the switch when the beam or beams are interrupted. This arrangement prevents the inadvertent lowering of the platform by manual closing of the switch 74 before the load is removed from the pallets thereon. The details of the photo-electric mechanism are not shown since they are well known.

As previously mentioned, the movement of pallets from conveyor section 11 onto the gate or platform 40 is controlled by the stop rolls 25, and the operation of these rolls is controlled by switches 37, 38. Switch 37 has an actuating member 78 which is engaged and tilted to momentarily close the switch by a lug 79 on the platform 40 as the platform is moved into position to receive pallets from the conveyor section 11. The momentary closing of switch 37 causes the rolls 25 to drop and thereby permit a pallet pressing thereagainst to move onto the platform each time the platform is moved from its pallet discharge position upwardly into registration with the conveyor section 16. Preferably, a normally open, manually operable switch 80 is connected in parallel circuit with switch 37 so that the solenoid 35 can be manually energized to lower the rolls 25 to initiate operation of the apparatus or otherwise as desired.

The operation of the switch 38 to control the solenoid 36 and cause the rolls 25 to be raised to stop oncoming pallets is controlled by a roll 82 located between rollers 18 of the central track of rollers in the conveyor section 16. The roll 82 is to the left of rolls 25 and is yieldingly positioned above the level of the rollers of the conveyor section so that it is depressed by pallets thereon as they approach and are stopped by the rolls 25. The roll 82 is rotatably journaled at the ends of a pair of arms 83 which project from opposite ends of a sleeve 84 journaled on the rocker shaft 28 so that it oscillates independently of the oscillations of the shaft. The arms 83 are urged counterclockwise, as viewed in Fig. 3, by a tension spring 85 having one end anchored to the frame of conveyor section 11 and the other end connected to an arm 86 on the sleeve 84. The arms 83 engage a part, not shown, of the conveyor frame which limits upward movement thereof by the spring 85 to a position in which the top of the roll 82 is normally slightly above the tops of the rollers 18 so that a pallet rolling on the rollers of the conveyor section 11 toward the stop rolls 25 depresses the roll 82. The switch 15 has an actuating member 87 which is moved to open the switch by a cam 88 on the sleeve 84 and positioned to engage the member 87 when the arms 83 are moved by the depression of the roll 82. The depression of roll 82 by a pallet moving thereover causes the normally closed switch 15 to be opened, thereby deenergizing the conveyor motor 13 and preventing additional pallets being fed onto the conveyor section 16 until such time as the pallet depressing the roll moves onto the platform 40.

The normally open switch 38, previously referred to, and which controls energization of solenoid 36 to shift the valve 34 to actuate motor 30 to raise rollers 25, has an actuating member 90 which is arranged to be engaged by a cam 91 on the sleeve 84 to momentarily close and then open the switch during movement of the arms 83 from their depressed to their raised position. The switch 38 is thereby momentarily closed by a pallet moving away from the roller 82 to energize the solenoid 36 and operate the valve 34 as described to cause the rolls 25 to move into position to stop a succeeding pallet from entering the loading station.

From the foregoing it will be apparent that the operation of the apparatus is automatically controlled to prevent movement of pallets from the conveyor section 11 onto the platform 40 while a pallet is thereon and that after an empty pallet is discharged from the platform, a succeeding loaded pallet is automatically moved thereon.

While in the preferred embodiment of the invention shown the movement of the platform 40 from its elevated to its discharge position, and vice versa, is initiated by manually depressing one or the other of the push button switches 73, 74, the invention contemplates the provision of means for automatically initiating these operations; for example, the circuit to solenoid 71 may be momentarily closed and the solenoid energized to shift the valve 70 to actuate the motor 51 to raise the platform 50 from its discharge to its elevated position by a switch carried by the platform 40 and controlled by a roller thereon similar to the roller 82, which roller is moved from depressed to elevated position by a spring bias means as an empty pallet on the platform 40 moves therefrom onto the conveyor 50. In like manner, the circuit to the solenoid 72 which controls the valve 70 to energize the motor 51 to lower the platform 40 to its discharge position can be supplemented to include an arrangement whereby the platform will be automatically lowered as the last battery is moved therefrom and the light source to the photoelectric cell means, previously referred to, established.

The return conveyor 50 is preferably of the continuously driven belt-type and is operative to transport the empty pallets deposited thereon by the platform 40 to a stacking area S. The conveyor shown includes a belt 94 supported at the ends of the conveyor by pulleys 95, 96, one of which is driven by an electric motor 97 through a suitable drive. The intermediate portions of the belt are supported in a conventional manner and it is not deemed necessary to describe the details thereof. Preferably the entire conveyor 50 is in the trench T and immediately below the conveyor A so that the conveyors occupy a minimum of space.

When the apparatus is shunt down, it may be desirable to lock the stop rolls 25 in their raised position to prevent pallets on the conveyor section 11 from rolling toward the platform 40, and for this purpose a rocker shaft 100 is journaled to the frame of the conveyor section 11 and extends transversely thereof. A pair of arms 101 are attached to the rocker shaft 100 adjacent to opposite ends thereof and the ends of the arms are adapted to be swung under and engage the cross bars 29 interconnecting the arms 26, 27 supporting the respective rolls 25 to maintain the rolls in their raised position. The rocker shaft 100 is oscillated to swing the arms 101 thereof into and out of engagement with the bars 29 by a handle 104 attached to one end thereof.

It will be seen that by our invention loaded pallets can be readily and conveniently brought to an unloading station and subsequent to unloading are quickly dispatched to a stacking area for re-use by conveyor means so disposed as to provide a maximum free working area at the unloading station. By this arrangement a minimum of operators can be employed in the operation of unloading the pallets and returning them to a storage or re-use area. Although the conveyor for returning the empty pallets is shown beneath the conveyor for carrying the loaded pallets to the unloading station, it will be appreciated that the empty pallet conveyor could be disposed at a different position if desired.

While the preferred form of the invention has been described in considerable detail and with reference to its use in connection with the handling of storage batteries, it is to be understood that the invention is not limited to the use or construction shown and it is our intention to cover hereby all adaptations, modifications and changes therein which come within the practice of those skilled in the art to which the invention relates and the scope of the appended claims.

Having thus described my invention I claim:

1. In a pallet handling apparatus, a conveyor means including a section driven by power means and a gravity operated section having a pallet discharge end, a platform alignable with the discharge end of said conveyor means to receive pallets from said conveyor means and shiftable to discharge pallets therefrom, and means to control movement of pallets from said conveyor means to said platform comprising a control device operative in synchronism with movement of said platform to alignment with the discharge end of said conveyor, means to permit a pallet to be discharged from said conveyor means to said platform, and a control device responsive to the passage of a pallet from said conveyor means toward the discharge end thereof to prevent movement of succeeding pallets on said gravity operated section to the discharge end thereof and responsive to the presence of a pallet held on said gravity section to render said power driven section inoperative.

2. In a pallet handling apparatus, a conveyor means including a power driven loading section and a gravity operated section having a discharge end, a platform alignable with the discharge end of said conveyor means to receive pallets from said conveyor means and shiftable to discharge pallets therefrom, a stop member movable into the path of movement of pallets on said gravity operated section of said conveyor means to prevent discharge of pallets from said conveyor means, a pneumatic motor operative to move said stop member into the path of pallets on said gravity operated section of said conveyor means, and control mechanism for said pneumatic motor responsive to movement of said platform into alignment with the discharge end of said conveyor means to cause said motor to move said stop member from said path of the pallets and responsive to the passage of a pallet from said gravity operated section to said platform to render said pneumatic motor operative to move said stop member into the path of movement of pallets on said gravity operated section of said conveyor means.

3. In a pallet handling system, a conveyor means to receive loaded pallets thereon and move said pallets to the discharge thereof, a shiftable platform alignable with the discharge of said conveyor means to receive pallets therefrom and shiftable to discharge pallets therefrom, a conveyor means disposed to receive pallets from said platform, power means to shift said platform, and control means for said power means comprising a control member and a device responsive to the presence of a load on the pallet on said platform to render said control member inoperative while a load is on the last mentioned pallet.

4. In a pallet handling system, a conveyor means to receive loaded pallets thereon and move said pallets to the discharge thereof, a shiftable platform alignable with the discharge of said conveyor means to receive pallets therefrom and shiftable to discharge pallets therefrom, a conveyor means disposed to receive pallets from said platform, power means to shift said platform, and control means for said power means comprising a manual control member and a device responsive to the presence of a load on the pallet on said platform to render said control member inoperative while a load is on the last mentioned pallet.

5. In a pallet handling apparatus, a conveyor means to receive loaded pallets thereon and move said pallets to the discharge end thereof, a platform alignable with the discharge of said conveyor means to receive pallets thereon and shiftable to discharge pallets therefrom, conveyor means to receive pallets discharged from said platform, power means to shift said platform, and electric control means for said power means comprising a manual switch and a photo-electrically operated switch responsive to a light beam directed above the surfaces of pallets on said platform and connected in series circuit with said manual switch.

6. In a pallet handling apparatus, conveyor means to receive loaded pallets thereon and move said pallets to a discharge end thereof, a conveyor at a different level than the first mentioned conveyor and adapted to move pallets thereon to a discharge station, a platform movable vertically between upper and lower positions to receive pallets from said first conveyor means and to discharge pallets onto said conveyor power means to move said platform between said two positions, a manual control member operative to cause said power means to move said platform to discharge a pallet thereon onto said conveyor, and mechanism responsive to the presence of a load on the pallet on said platform to render said manual control member ineffective in the event a load is on the last mentioned pallet.

7. In an article handling apparatus, a conveyor means including a section driven by power means and a gravity operated section having a discharge end, a platform alignable with the discharge end of said conveyor means to receive articles from said conveyor means, power means for tilting said platform to discharge articles therefrom, means to control movement of articles from said conveyor means to said platform comprising a control device operative in synchronism with movement of said platform into alignment with the discharge end of said conveyor, means to permit an article to be discharged from said conveyor means to said platform, and a control device responsive to the passage of an article from said conveyor means toward the discharge end thereof to prevent movement of succeeding articles on said gravity operated section to the discharge end thereof and responsive to the presence of an article held on said gravity section to render said power driven section inoperative.

8. In an article handling apparatus, a conveyor means including power driven loading section and a gravity operated section having a discharge end, a platform alignable with the discharge of said conveyor means to receive articles from said conveyor means, power means for shifting said platform into a tilting position to discharge articles therefrom, a pneumatic motor for tilting said platform, means for locking said platform in alignment with the discharge end of said conveyor means, said last-mentioned means being operated by said power means, a stop member movable into the path of movement of articles on said gravity operated section of said conveyor means to prevent discharge of articles from said conveyor means, a pneumatic motor operative to move said stop member into the path of articles on said gravity operated section of said conveyor means, and control mechanism for said last-mentioned pneumatic motor responsive to movement of said platform into alignment with the discharge end of said conveyor means to cause said motor to move said stop member from said path of the articles and responsive to the passage of an article from said gravity operated section to said platform to render said pneumatic motor operative to move said stop member into the path of movement of articles on said gravity operated section of said conveyor means.

9. In a pallet dispatching system, a first conveyor to receive loaded pallets thereon and move said pallets to an unloading station, a second conveyor arranged to convey unloaded pallets from said station, said station comprising a pallet receiving platform shiftable between a pallet receiving position in alignment with said first conveyor and a pallet discharge position in which pallets thereon are discharged onto said second conveyor, a pair of toggle links to support the swinging end of said platform when said links are in dead center position, a pivot means to pivotally connect one of said links with said platform, a motor for raising said platform including a piston connected to said pivot means and operative to urge said link to its dead center position relative to the other of said links when said piston is moved to raise said platform and to move said link when said piston is moved in a direction to lower said platform, stop means to control movement of pallets from said first conveyor onto said platform, manual control means for actuating said motor to shift said platform from said pallet receiving position in alignment with said first conveyor to a position to discharge pallets onto said second conveyor and return, means responsive to movement of said platform to the first mentioned position to operate said stop means to release a pallet held thereby for movement onto said platform, and means responsive to the movement of the pallet released by said stop means to render said stop means operative to block movement of a succeeding pallet on said conveyor and approaching said platform.

References Cited in the file of this patent
UNITED STATES PATENTS

| | | |
|---|---|---|
| 1,556,438 | Hanson et al. | Oct. 6, 1925 |
| 1,613,552 | Armstrong | Jan. 4, 1927 |
| 1,698,326 | Vold et al. | Jan. 8, 1929 |
| 1,868,560 | Beach et al. | July 26, 1932 |
| 1,889,846 | Wright | Dec. 6, 1932 |
| 1,901,360 | Snow | Mar. 14, 1933 |
| 2,052,968 | Eaton | Sept. 1, 1936 |
| 2,304,447 | Feusier | Dec. 8, 1942 |
| 2,525,953 | Saxe | Oct. 17, 1950 |
| 2,576,369 | Sticelber | Nov. 27, 1951 |